US009914327B2

(12) United States Patent
Mangano et al.

(10) Patent No.: US 9,914,327 B2
(45) Date of Patent: Mar. 13, 2018

(54) CASTER WHEEL ASSEMBLY

(71) Applicant: INGENIOUS DESIGNS LLC, Ronkonkoma, NY (US)

(72) Inventors: Joy Mangano, St. James, NY (US); Michael Morgan Starkey, Charlotte, NC (US); Thomas James Philpott, Fort Mill, SC (US)

(73) Assignee: Ingenious Designs LLC, Ronkonkoma, NY (US)

( * ) Notice: Subject to any disclaimer, the term of this patent is extended or adjusted under 35 U.S.C. 154(b) by 0 days.

(21) Appl. No.: 15/306,281

(22) PCT Filed: Apr. 17, 2015

(86) PCT No.: PCT/US2015/026399
§ 371 (c)(1),
(2) Date: Oct. 24, 2016

(87) PCT Pub. No.: WO2015/164203
PCT Pub. Date: Oct. 29, 2015

(65) Prior Publication Data
US 2017/0043621 A1    Feb. 16, 2017

Related U.S. Application Data

(60) Provisional application No. 61/983,636, filed on Apr. 24, 2014.

(51) Int. Cl.
*A47B 91/00* (2006.01)
*B60B 33/00* (2006.01)
(Continued)

(52) U.S. Cl.
CPC .......... *B60B 33/0039* (2013.01); *A45C 5/141* (2013.01); *B60B 19/12* (2013.01);
(Continued)

(58) Field of Classification Search
CPC .......... A45C 5/143; A45C 5/14; A45C 5/141; A45C 5/145; A45C 2005/142;
(Continued)

(56) References Cited

U.S. PATENT DOCUMENTS

| 313,097 | A |   | 3/1885 | Michelson |
| 817,739 | A | * | 4/1906 | Loepp ..................... B60B 19/00 |
|  |  |  |  | 172/538 |

(Continued)

FOREIGN PATENT DOCUMENTS

| CA | 1129821 A1 | 8/1982 |
| EP | 3123893 A1 * | 2/2017 |

(Continued)

OTHER PUBLICATIONS

International Search Report dated Jul. 24, 2015 issued in corresponding PCT Application No. PCT/US2015/26399.

*Primary Examiner* — Chuck Mah
(74) *Attorney, Agent, or Firm* — Andrews Kurth Kenyon LLP

(57) ABSTRACT

A caster wheel assembly includes a wheel mounted for rotation about a horizontal axis within a wheel carriage such that the wheel rotates about the horizontal axis with respect to the wheel carriage. The wheel carriage is positioned within a retention ring such that the wheel carriage can rotate about the vertical axis with respect to the retention ring. The wheel carriage also has an opening on the bottom surface such that the wheel can make contact with the ground. The horizontal axis about which the wheel rotates is offset from the vertical axis about which the wheel carriage rotates. An outer carriage may be included such that the outer carriage is positioned within the retention ring and the wheel carriage is positioned within the outer carriage. The outer carriage (Continued)

would be able to rotate about the vertical axis with respect to both the retention ring and the wheel carriage.

19 Claims, 8 Drawing Sheets

(51) Int. Cl.
*A45C 5/14* (2006.01)
*B60B 19/12* (2006.01)

(52) U.S. Cl.
CPC .......... *B60B 33/00* (2013.01); *B60B 33/0005* (2013.01); *B60B 33/006* (2013.01); *B60B 33/0015* (2013.01); *B60B 33/0042* (2013.01); *B60B 33/0049* (2013.01); *B60B 33/0068* (2013.01); *A45C 2005/142* (2013.01); *B60B 33/0028* (2013.01); *B60B 2200/45* (2013.01); *B60B 2360/32* (2013.01); *B60B 2360/324* (2013.01); *B60B 2900/121* (2013.01); *B60B 2900/212* (2013.01); *B60B 2900/321* (2013.01)

(58) Field of Classification Search
CPC . B60B 33/00; B60B 33/0002; B60B 33/0005; B60B 33/001; B60B 33/0015; B60B 33/0013; B60B 33/08; B60B 33/039; B60B 33/0042; B60B 33/0049; B60B 33/006; B60B 33/0068; B60B 19/12; B60B 2220/45; B60B 2360/32; B60B 2360/324; B60B 2900/121; B60B 2900/212; B60B 2900/321; B62B 5/0083; B62B 2301/252; Y10T 16/188; Y10T 16/1887; Y10T 16/1889

See application file for complete search history.

(56) References Cited

U.S. PATENT DOCUMENTS

| | | | | |
|---|---|---|---|---|
| 1,154,448 A | * | 9/1915 | Sleicher | B60B 33/08 16/26 |
| 1,356,566 A | * | 10/1920 | Smith | B60B 33/08 16/26 |
| 1,358,543 A | * | 11/1920 | Hardon | B60B 33/08 16/26 |
| 1,367,301 A | * | 2/1921 | Chesnutt | B60B 33/0002 16/21 |
| 1,582,598 A | * | 4/1926 | Hancock | B60B 33/0002 16/21 |
| 1,743,255 A | | 1/1930 | Vervoort | |
| 2,203,539 A | * | 6/1940 | Milich | B60B 33/08 16/26 |
| 2,426,664 A | | 9/1947 | Blazey | |
| 2,779,965 A | * | 2/1957 | Schilberg | B60B 33/08 16/24 |
| 3,067,451 A | | 12/1962 | Levin | |
| 3,345,675 A | * | 10/1967 | Haydock | B60B 33/00 16/18 CG |
| 4,026,570 A | | 5/1977 | Feinberg | |
| 4,060,252 A | * | 11/1977 | Mowery | B65D 19/42 16/18 R |
| 4,203,177 A | * | 5/1980 | Kegg | B60B 33/08 16/24 |
| 4,700,430 A | | 10/1987 | Raftery | |
| 5,076,412 A | * | 12/1991 | Huber | B65G 13/10 193/35 MD |
| 5,134,753 A | | 8/1992 | Rekuc | |
| 5,906,247 A | * | 5/1999 | Inoue | B60B 19/14 16/26 |
| 6,134,747 A | * | 10/2000 | Leibman | B60B 33/0002 16/24 |
| 6,148,971 A | * | 11/2000 | Kho | A45C 5/14 190/115 |
| 6,223,388 B1 | * | 5/2001 | Sey | B60B 33/0002 16/20 |
| 6,398,232 B1 | * | 6/2002 | Dahan | A63C 17/06 280/11.226 |
| 6,454,065 B1 | * | 9/2002 | Chen | A45C 5/14 16/18 B |
| 6,508,335 B2 | * | 1/2003 | Zinanti | A63C 17/01 188/1.12 |
| 6,840,359 B2 | * | 1/2005 | Godshaw | A45C 5/14 16/47 |
| 6,854,159 B2 | * | 2/2005 | Ruitenbeek | B60B 33/0002 16/18 CG |
| 7,748,508 B2 | * | 7/2010 | Lee | A45C 5/14 190/115 |
| 8,739,364 B2 | * | 6/2014 | Fromm | B60B 33/0023 16/19 |
| 2006/0101614 A1 | * | 5/2006 | Sellars | B60B 33/08 16/25 |
| 2008/0135366 A1 | * | 6/2008 | Katz | A45C 5/14 190/18 A |
| 2009/0218187 A1 | * | 9/2009 | Chung | A45C 5/143 190/18 A |

FOREIGN PATENT DOCUMENTS

| | | | | |
|---|---|---|---|---|
| GB | 2331696 A | * | 6/1999 | B60B 33/00 |
| WO | 01/49513 A1 | | 7/2001 | |

* cited by examiner

CASTER WHEEL ASSEMBLY

CROSS-REFERENCE TO RELATED APPLICATIONS

This application is the U.S. National Phase of PCT/US2015/026399, filed on Apr. 17, 2015, and which claims the benefit under 35 U.S.C. § 119(e) of U.S. Provisional Application No. 61/983,636, filed Apr. 24, 2014, the content of which are incorporated herein by reference in their entirety.

BACKGROUND

The typical caster wheel assembly may include a horizontal offset between the horizontal rotational axis of the caster wheel and the vertical axis of the caster pivot to allow the wheel to track in the direction of travel. The caster pivot is also known as the caster stem or the caster kingpin. The offset creates a moment arm in the horizontal direction between the caster pivot and the point of contact between the ground and the wheel. This offset is what allows the force generated by the motion of the object to pivot the wheel about the vertical axis of the caster pivot to allow the wheel to rotate in the direction of the motion of the object being supported by the caster wheel assembly.

However, in the typical caster wheel assembly, the horizontal rotational axis of the caster wheel is generally positioned at a vertical distance below the pivot joint of the caster pivot. During operation, the horizontal force acting upon the wheel, which is transferred to the horizontal rotational axis of the wheel at a vertical distance from the pivot joint, may cause the pivot joint of the caster pivot to bend or wobble rather than rotate, which results in mechanical stress on the pivot joint. Over time, the pivot joint of the caster pivot may be damaged by such stress and cause the caster wheel assembly to fail.

Thus, there is a continual need for an improved caster wheel assembly that reduces the bending stress to the caster pivot and increases the efficient pivot motion of the caster pivot.

BRIEF DESCRIPTION

The present disclosure relates to an improved caster wheel with added freedom of movement.

In accordance with certain embodiments of the present invention, a caster wheel assembly includes a wheel mounted for rotation about a horizontal axis within a wheel carriage. The wheel is oriented so that it rotates about the horizontal axis with respect to the wheel carriage. The wheel carriage is positioned within a retention ring such that the wheel carriage is able to rotate about the vertical axis with respect to the retention ring. The wheel carriage also has an opening on the bottom surface such that the wheel is able to make contact with the ground. The horizontal axis about which the wheel rotates is offset from the vertical axis about which the wheel carriage rotates. An outer carriage may be included such that the outer carriage is positioned within the retention ring and the wheel carriage is positioned within the outer carriage. The outer carriage would be able to rotate about the vertical axis with respect to both the retention ring and the wheel carriage.

In accordance with other embodiments of the present invention, a roller assembly includes at least one caster wheel. The caster wheel is generally the same as described above and includes a wheel mounted for rotation about a horizontal axis within a wheel carriage. The wheel rotates about the horizontal axis with respect to the wheel carriage. The wheel carriage is positioned within a retention ring such that the wheel carriage is able to rotate about the vertical axis with respect to the retention ring. The wheel carriage also has an opening on the bottom surface such that the wheel is able to make contact with the ground. The horizontal axis about which the wheel rotates is offset from the vertical axis about which the wheel carriage rotates. An outer carriage may be included such that the outer carriage is positioned within the retention ring and the wheel carriage is positioned within the outer carriage. The outer carriage would be able to rotate about the vertical axis with respect to both the retention ring and the wheel carriage. The retention ring is fixed to the roller base of the roller assembly. The roller assembly also includes at least one auxiliary wheel, wherein the auxiliary wheel is mounted at an edge of the bottom surface. The auxiliary wheel is configured to rotate about a second horizontal axis parallel with the edge of the bottom surface. The auxiliary wheel is displaced vertically from the caster wheel such that when the bottom surface is parallel to the ground and the caster wheel is in contact with the ground, the auxiliary wheel is not in contact with the ground. The auxiliary wheel is elongated along its axis and tapered at its center such that it may be mounted in close proximity to the caster wheel.

In accordance with still other embodiments of the present invention, a wheel may be mounted for rotation about a horizontal axis within a wheel carriage such that the wheel rotates about the horizontal axis with respect to the wheel carriage. The wheel carriage is mounted within an outer carriage such that the wheel carriage is able to rotate about a first vertical axis with respect to the outer carriage. The wheel carriage has an opening on the bottom surface such that the wheel is able to make contact with the ground. The horizontal axis about which the wheel rotates is offset from the first vertical axis about which the wheel carriages rotates. The outer carriage is positioned within a retention ring such that the outer carriage is able to rotate about a second vertical axis with respect to the retention ring. The second vertical axis is offset from the first vertical axis.

The invention may be embodied by numerous other devices and methods. The description provided herein, when taken in conjunction with the annexed drawings, discloses examples of the invention. Other embodiments, which incorporate some or all elements as taught herein, are also possible.

BRIEF DESCRIPTION OF THE DRAWINGS

The various objects, advantages and novel features of this invention will be more fully apparent from a reading of the following detailed description in conjunction with the accompanying drawings in which like reference numerals refer to like parts, and in which.

DETAILED DESCRIPTION

The present disclosure relates to an improved caster wheel with added freedom of movement.

Figure 1:
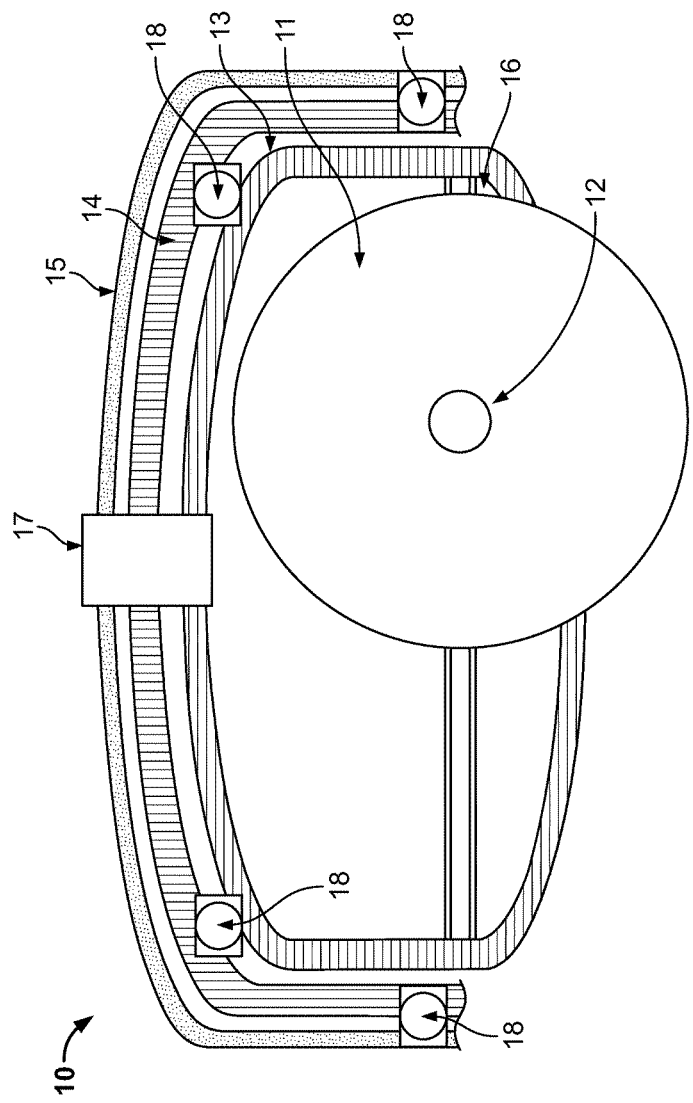
FIG. 1 is a cross-sectional view of a caster wheel assembly in accordance with certain embodiments of the present disclosure.

FIG. 1 shows a cross-sectional view of a caster wheel assembly 10 as may be employed in accordance with certain embodiments of the present invention. In the example, the caster wheel assembly has a wheel 11, which rotates about a shaft 12. The wheel 11 may be a spherical shape. In the absence of the shaft 12, it is contemplated that the wheel 11 may rotate about a horizontal axis by virtue of a hubless bearing arrangement.

The shaft 12 is shown as being fixed in relation to the wheel carriage 13 which supports the shaft 12. Thus, wheel 11 is free to rotate with respect to the wheel carriage 13. The wheel carriage 13 is itself free to rotate about a vertical axis extending through its geometric center. In the example, there is a pivot shaft 17 at the vertical axis extending through the wheel carriage 13, the outer carriage 14, and the retention ring 15. The shaft 12 is offset from the vertical axis such that there is a moment arm created between the vertical axis and the center of the wheel 11. When a force is applied to the caster wheel assembly, this moment arm causes the wheel 11 to track in the direction of the force.

The wheel carriage 13 includes an opening 16 in its bottom surface that allows the wheel 11 to protrude and make contact with the ground. In the example, the wheel carriage 13 is positioned within an outer carriage 14. In the example, ball bearings 18 are disposed between the wheel carriage 13 and the outer carriage 14 such that the wheel carriage 13 is free to rotate about the vertical axis with respect to outer carriage 14. It is also contemplated that alternatives to the ball bearings 18 may be employed with certain embodiments of the present invention such as, for example, a bearing race surface that tracks the inside of the outer carriage 14. In the example, a pivot shaft 17 is employed at the vertical axis which extends through the outer carriage 14 at its geometric center such that outer carriage 14 rotates about the pivot shaft 17.

The outer carriage 14 is positioned within a retention ring 15. In the example, ball bearings 18 are disposed at the interface between the outer carriage 14 and the retention ring 15 such that the outer carriage 14 is free to rotate with respect to the retention ring 15. It is also contemplated that alternatives to the ball bearings 18 may be employed with certain embodiments of the present invention such as, for example, a bearing race surface that tracks the inside of the retention ring 15. The retention ring 15 may be fixed to another object, such as a suitcase, so that the caster wheel assembly 10 supports the object and allows it to roll.

It is also contemplated that the outer carriage 14 may be omitted such that the wheel carriage 13 is positioned directly within the retention ring 15. Thus, the wheel carriage 13 would be free to rotate about the vertical axis with respect to the retention ring 15. In a configuration which omits the outer carriage 14, it would only be necessary to dispose ball bearings at the interface between the outer carriage 14 and the retention ring 15.

In the example shown in FIG. 1, each of the wheel carriage 13, the outer carriage 14 and the retention ring 15 is a dome shape. It is contemplated that other configurations are possible with certain embodiments of the present invention including, but not limited to cylinders, spheres, rings and inverted cups. Preferably, the wheel carriage 13, the outer carriage 14 and the retention ring 15 are comprised at least in part of a material capable of flexing and bending. These flexing and bending portions of the wheel carriage 13, the outer carriage 14 and the retention ring 15 act as a vertical "crumple zone" and allow the caster wheel assembly 10 to absorb a portion of any vertical impact energy before transferring it to the object it supports. By flexibly absorbing vertical impact energy, damage due to excessive physical stress on the caster wheel assembly 10 is reduced. Furthermore, by flexibly absorbing vertical impact energy, the caster wheel assembly 10 protects the object it supports from excessive shock. This allows a user to more safely transport fragile materials when the caster wheel assembly 10 is used instead of a traditional caster wheel. The material capable of flexing and bending may be a viscoelastic material such as, for example, polyurethane at 90A hardness. Other materials at different hardness ratings may be possible for optimizing the caster wheel assembly 10.

It is further contemplated that the wheel carriage 13 may comprise at least two separate pieces: an upper piece and a lower piece. In such a configuration, the upper piece is constructed such that it supports the shaft 12 about which the wheel 11 rotates. The upper piece is adapted to interface with the retention ring 15. The lower piece is constructed such that it has an opening through which the wheel 11 protrudes in order that the wheel 11 may contact the ground. The lower piece fits together with the upper piece so that the wheel 11 is substantially enclosed within the wheel carriage 13. The lower piece may fit together with the upper piece via a circumferential snap-fit, screws, or other suitable fastening means.

By configuring the wheel carriage 13, the outer carriage 14 and the retention ring 15 as domes, cylinders, spheres, rings or inverted cups and including bearings 18 at the interfaces between them, stress on the pivot shaft 17 is greatly reduced. Stresses that would traditionally be born solely on the pivot shaft 17 are spread across the surfaces of each of the wheel carriage 13, the outer carriage 14 and the retention ring 15. Because the retention ring 15 is intended to be fixed to another object, the stress is eventually spread to the surface of that object with which the retention ring 15 interacts. Accordingly, the bending and wobbling associated with ordinary caster wheels are minimized.

Figure 2:
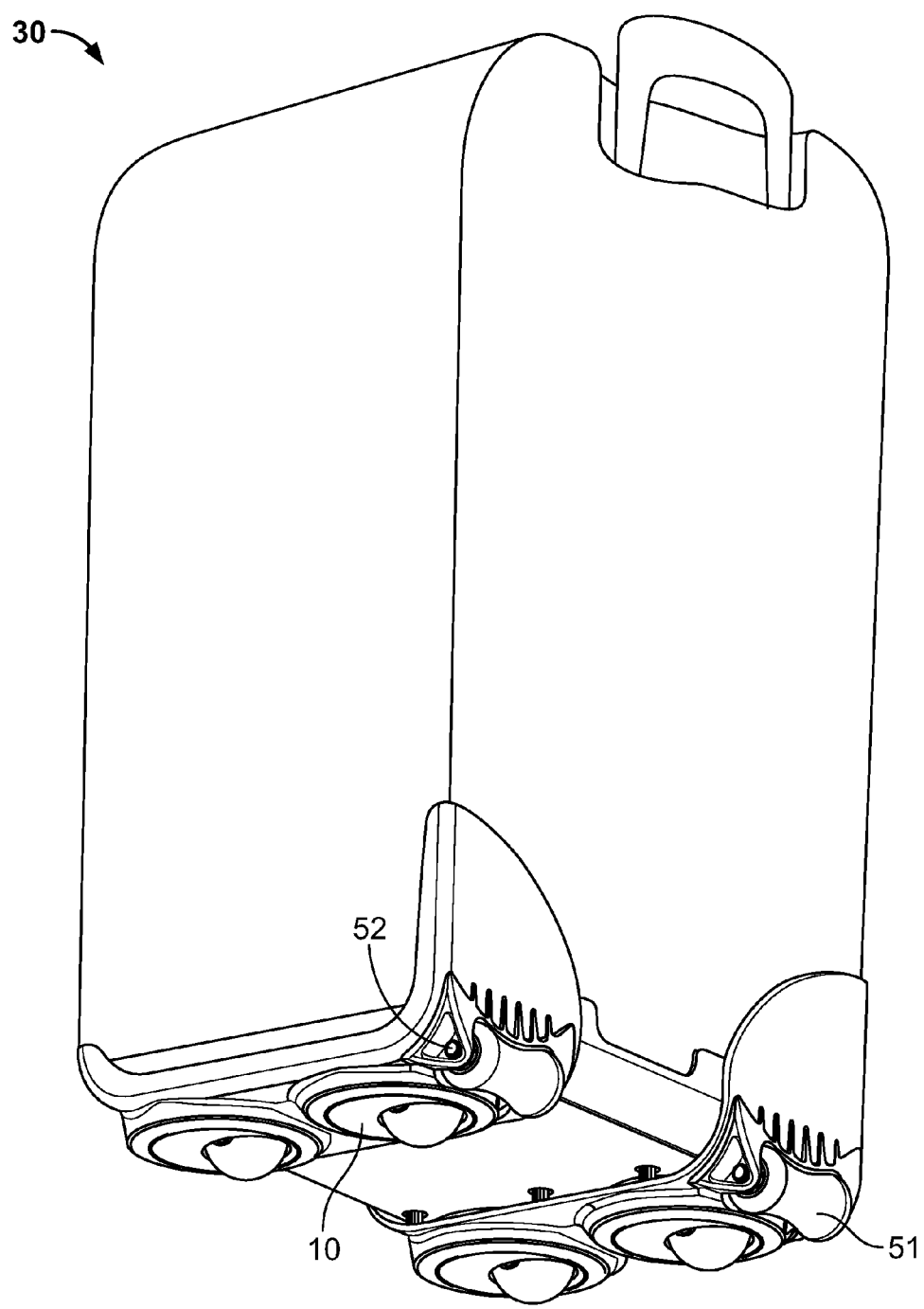
FIG. 2 is a perspective view of a suitcase in accordance with certain embodiments of the present disclosure.

FIG. 2 demonstrates an example in which a suitcase 30 includes four caster wheel assemblies 10 fixed to the bottom surface. The suitcase 30 is oriented such that the four caster wheel assemblies 10 are in contact with the ground and support the weight of the suitcase 30. In this configuration, the suitcase 30 may be moved by applying a force parallel to the plane of the ground in any direction. If not already oriented in the direction of the force, the caster wheel assemblies 10 track in the direction of the force.

The suitcase 30 as shown in the example in FIG. 2 also includes one or more auxiliary wheels 51 attached at the bottom leading edge of the suitcase 30. The auxiliary wheels 51 are offset some vertical distance from the caster wheel assemblies 10 so that the auxiliary wheels 51 are not in contact with the ground when all caster wheel assemblies 10 are in contact with the ground. The auxiliary wheels 51 rotate about a shaft 52 that is parallel to the leading bottom edge of the suitcase 30. The auxiliary wheels 51 are tapered at their center so that they may be mounted in close proximity to the caster wheel assemblies 10 which are circular in shape. This allows the suitcase 30 to employ both types of wheels while maintaining a compact and convenient shape. The auxiliary wheels 51 allow a user to tilt the suitcase 30 about the bottom leading edge and roll it more comfortably on only the auxiliary wheels 51 when the user does not intend to change directions.

Figure 3:
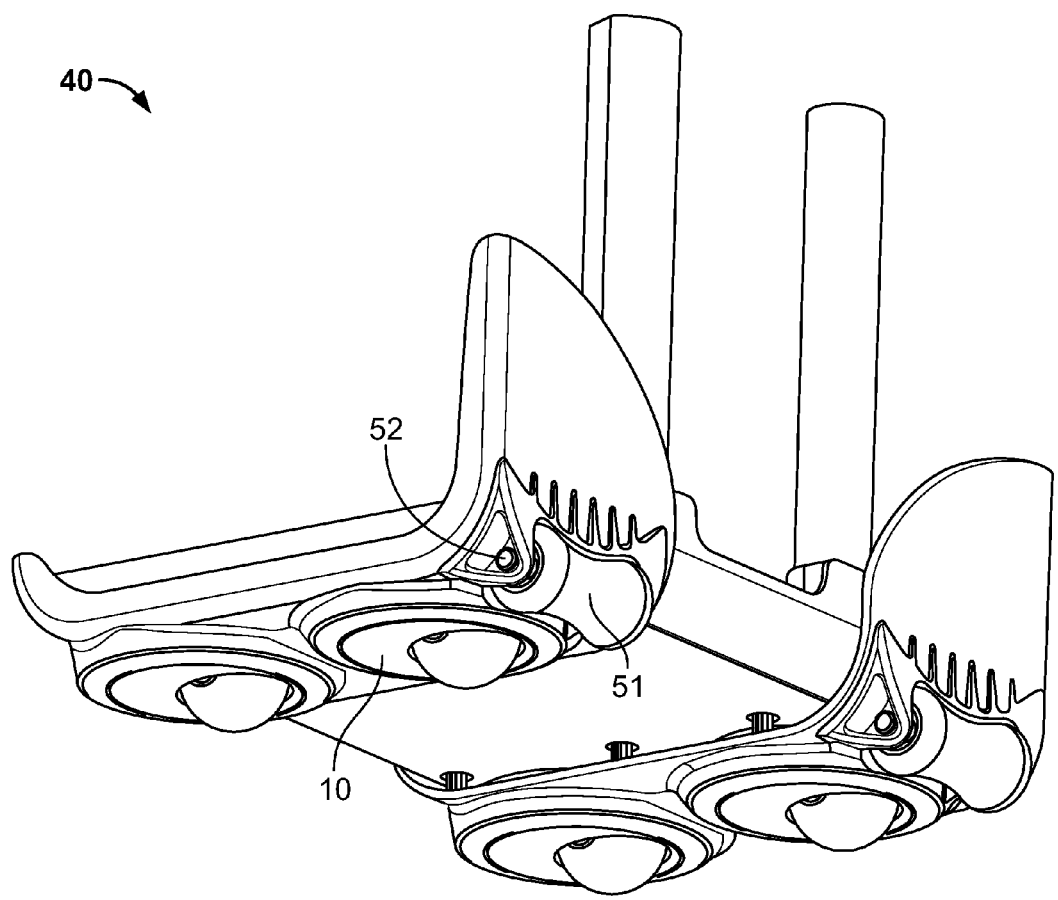
FIG. 3 is a perspective view of a roller assembly in accordance with certain embodiments of the present disclosure.

FIG. 3 illustrates an example of a roller assembly 40 with similar advantages as the suitcase 30 in FIG. 2. The roller assembly includes four caster wheel assemblies 10 fixed to its bottom surface. The roller assembly 40 may be oriented such that the four caster wheel assemblies 10 are in contact with the ground. In this configuration, the roller assembly 40 may be moved by applying a force parallel to the plane of the ground in any direction. If not already oriented in the direction of the force, the caster wheel assemblies 10 track in the direction of the force. The roller assembly 40 may also include auxiliary wheels 51 fixed to the leading bottom edge such that it the roller assembly 40 may be tipped about the leading bottom edge and roll on the auxiliary wheels 51.

Figure 4:
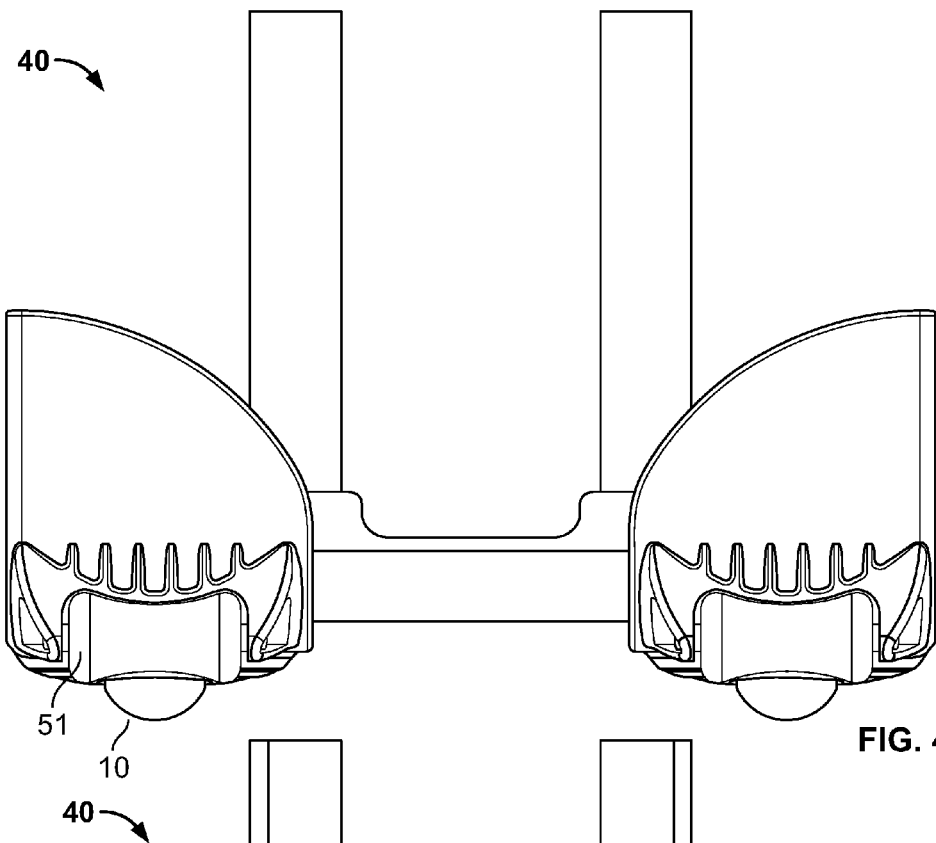
FIG. 4 is a front view of the roller assembly of FIG. 3 in accordance with certain embodiments of the present disclosure.
Figure 5:
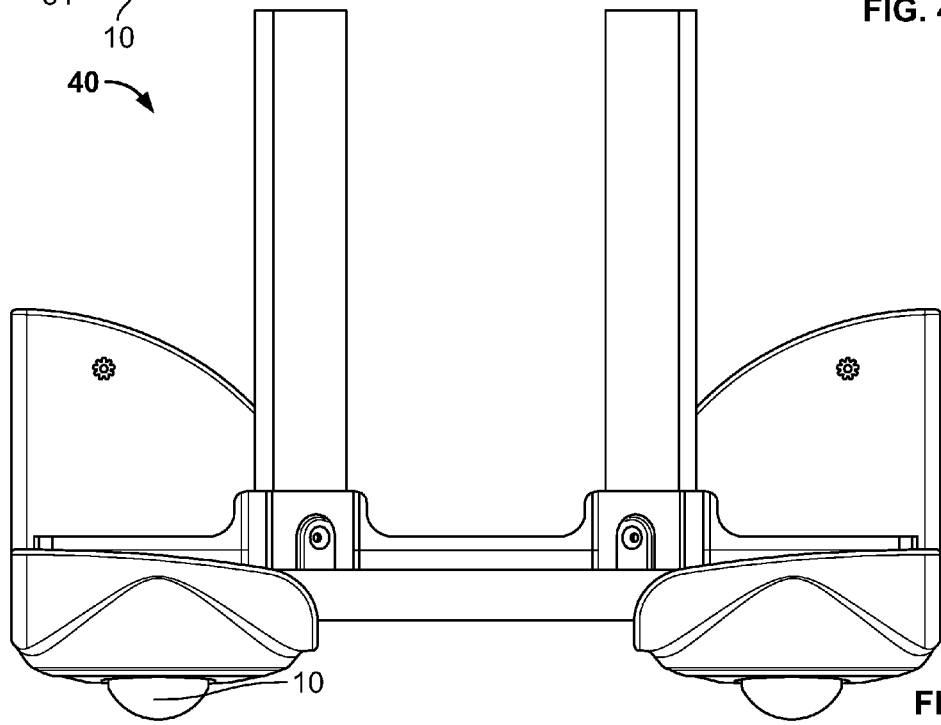
FIG. 5 is a rear view of the roller assembly of FIG. 3 in accordance with certain embodiments of the present disclosure.

FIGS. 4 and 5 show a front view and rear view respectively of the roller assembly 40 of FIG. 3. In the example, the auxiliary wheels 51 are mounted a vertical distance above the caster wheel assemblies 10 so that the auxiliary wheels 51 are not in contact with the ground when the caster wheel assemblies 10 are in contact with the ground. This allows the additional degrees of freedom of movement of the caster wheel assemblies 10 to be utilized when the caster wheel assemblies 10 are in contact with the ground.

Figure 6:
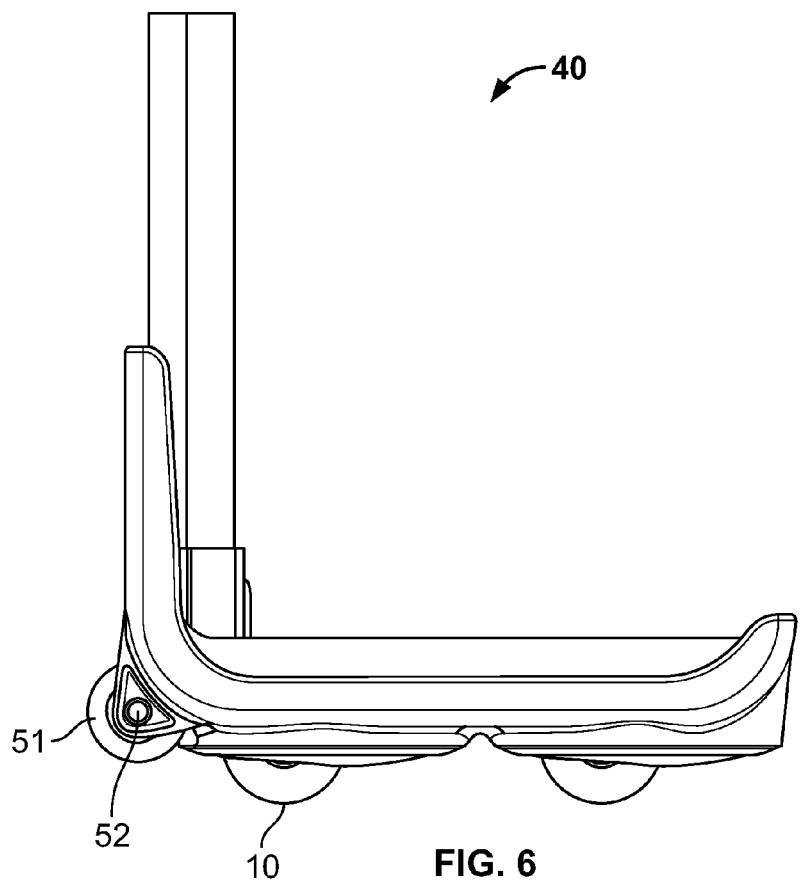
FIGS. 6-7 are side views of the roller assembly of FIG. 3 in accordance with certain embodiments of the present disclosure.
Figure 7:
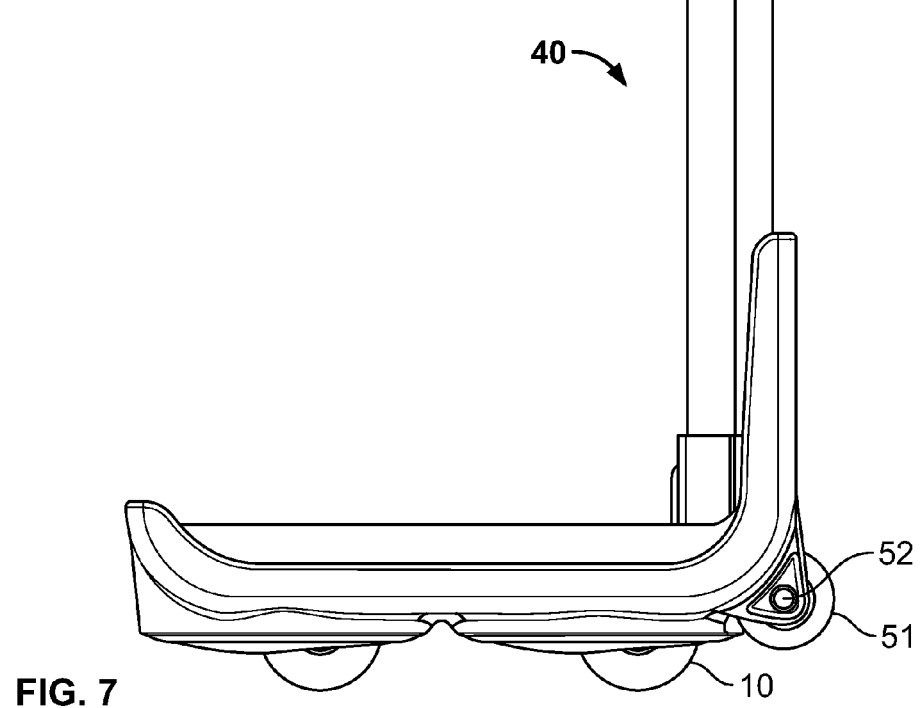

FIGS. 6 and 7 show side views of the roller assembly 40 of FIG. 3. The auxiliary wheel 51 rotates about a shaft 52 parallel to the leading bottom edge of the roller assembly 40. It is contemplated that the auxiliary wheel 51 may also rotate about a horizontal axis in a shaftless configuration. The auxiliary wheel 51 is mounted close to a caster wheel apparatus 10 to minimize the size of the roller assembly 40 in the horizontal direction.

Figure 8:
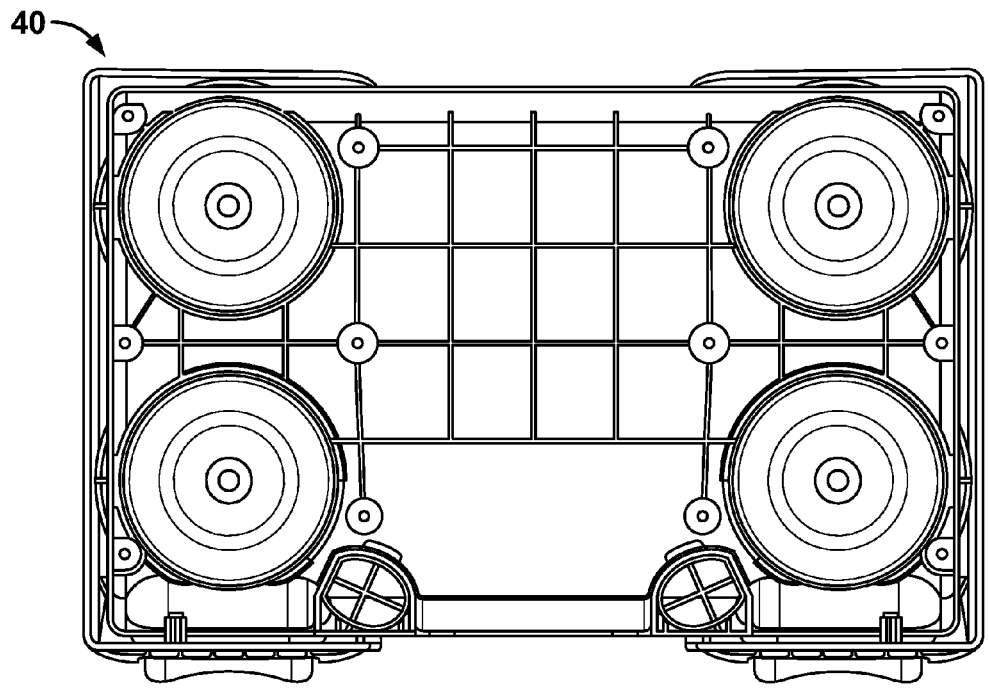
FIG. 8 is a top view of the roller assembly of FIG. 3 in accordance with certain embodiments of the present disclosure.
Figure 9:
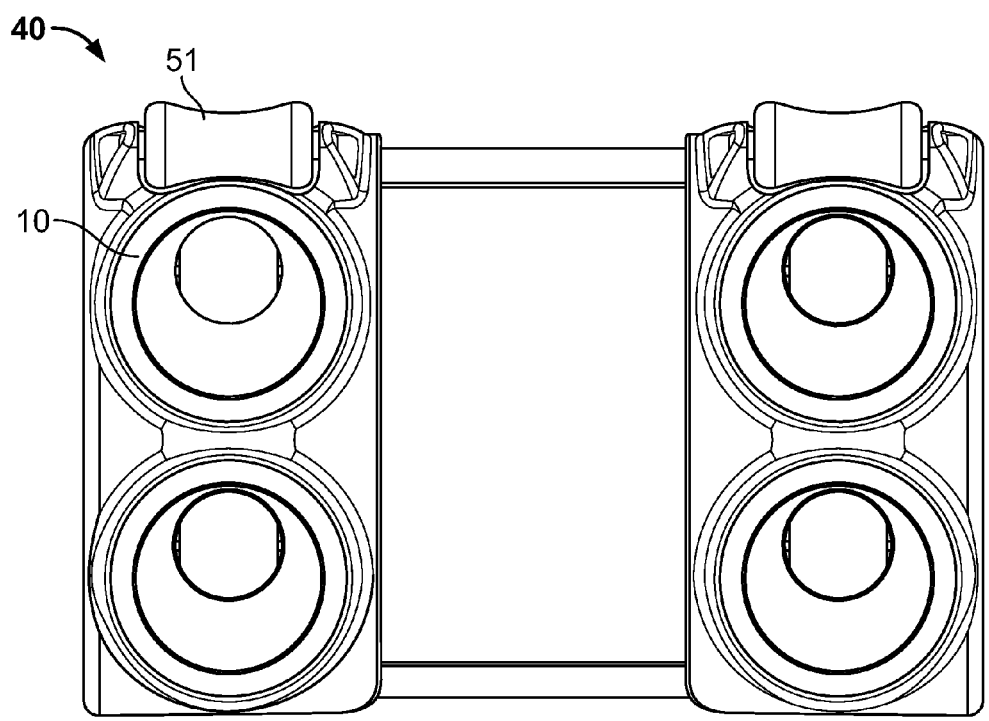
FIG. 9 is a bottom view of the roller assembly of FIG. 4 in accordance with certain embodiments of the present disclosure.

FIGS. 8 and 9 show a top-down and bottom-up view respectively of the roller assembly 40 of FIG. 3. The tapered shape of the auxiliary wheels 51 permit the auxiliary wheels 51 to be mounted closer to the caster wheel assemblies 10 which are circular in shape.

Figure 10:
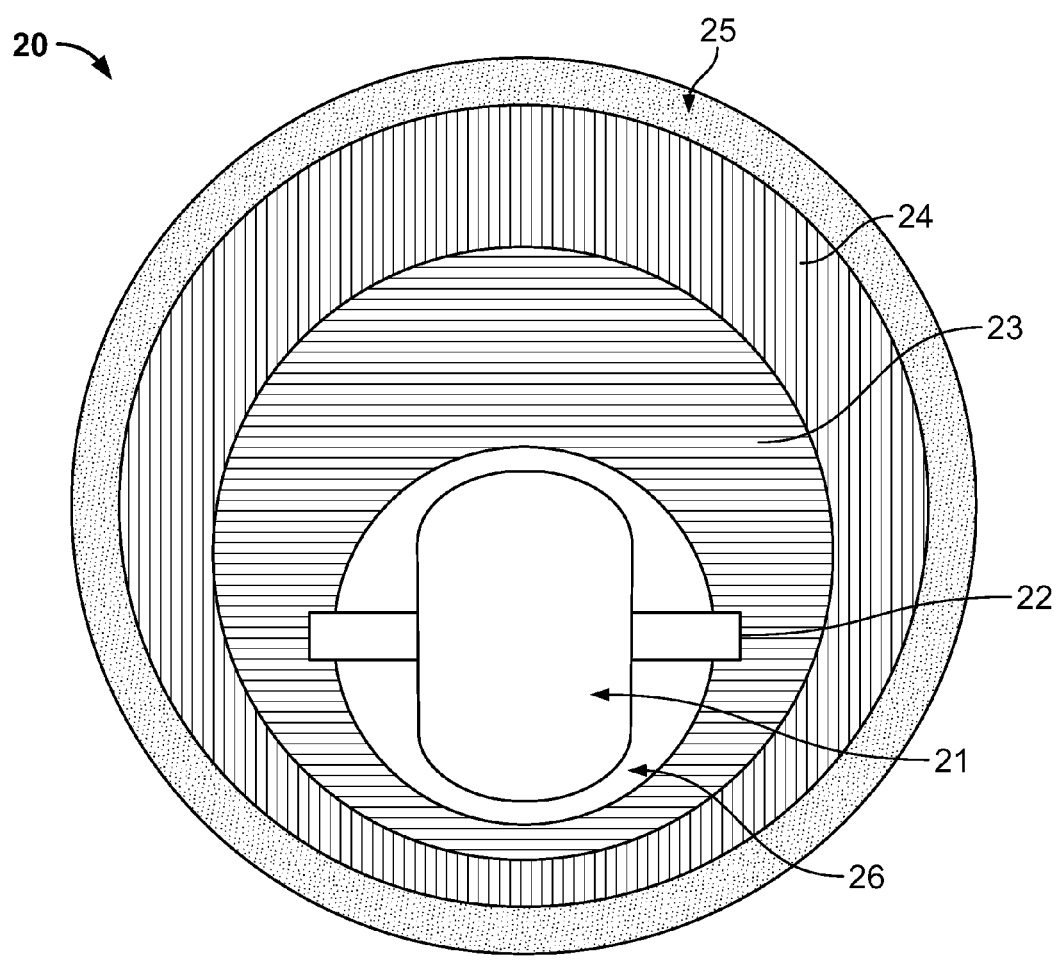
FIG. 10 is a top view of a caster wheel assembly in accordance with certain embodiments of the present disclosure.

FIG. 10 illustrates an example of an alternative embodiment of the present invention wherein a caster wheel assembly 20 has an additional degree of freedom of movement. The caster wheel assembly 20 includes a wheel 21 which may be supported by and rotate about a shaft 22. It is contemplated that the wheel 21 may also be mounted such that it rotates in a shaftless configuration in accordance with an embodiment of the present invention. In the example, the shaft 22 is fixed to a wheel carriage 23 such that the wheel 21 rotates with respect to the wheel carriage 23. The wheel carriage 23 has an opening 26 through which the wheel 21 protrudes so that it is able to contact the ground. The wheel carriage 23 may also have a cover extending from its bottom surface to protect the caster wheel assembly from horizontal impacts.

The wheel carriage 23 in the example is circular in shape and is positioned within an outer carriage 24. Ball bearings or other means for allowing rotation may be disposed between the wheel carriage 23 and the outer carriage 24 such that the wheel carriage 23 may rotate about an axis orthogonal to the page with respect to the outer carriage 24.

The outer carriage 24 is positioned within a retention ring 25 which may be fixed to an object such as a suitcase. Ball bearings or another means for allowing rotation may be disposed between the outer carriage 24 and the retention ring 25 such that the outer carriage 24 may rotate about an axis orthogonal to the page with respect to the retention ring 25.

It should be noted that preferably, the wheel carriage 23 and the outer carriage 24 are not concentric and therefore, the axes about which they rotate are offset from one another. Also, the shaft 22 about which the wheel 21 may rotate is offset from the vertical axis about which the wheel carriage 23 rotates. Thus, there are two moment arms acting on the wheel 21 when the wheel 21 tracks in the direction of the applied force. This additional degree of freedom of movement of the wheel 21 promotes smoothness in the tracking of the wheel 21 and reduces overall stress in the caster wheel assembly 20. Furthermore, in a configuration in which the wheel carriage 23, the outer carriage 24 and the retention ring 25 are coplanar, the typical vertical moment arm inherent in traditional caster wheels is eliminated. Thus, the caster wheel assembly 20 is less susceptible to unwanted wobbling or bending. The result is increased durability and stability of the caster wheel assembly 20.

Figure 11:
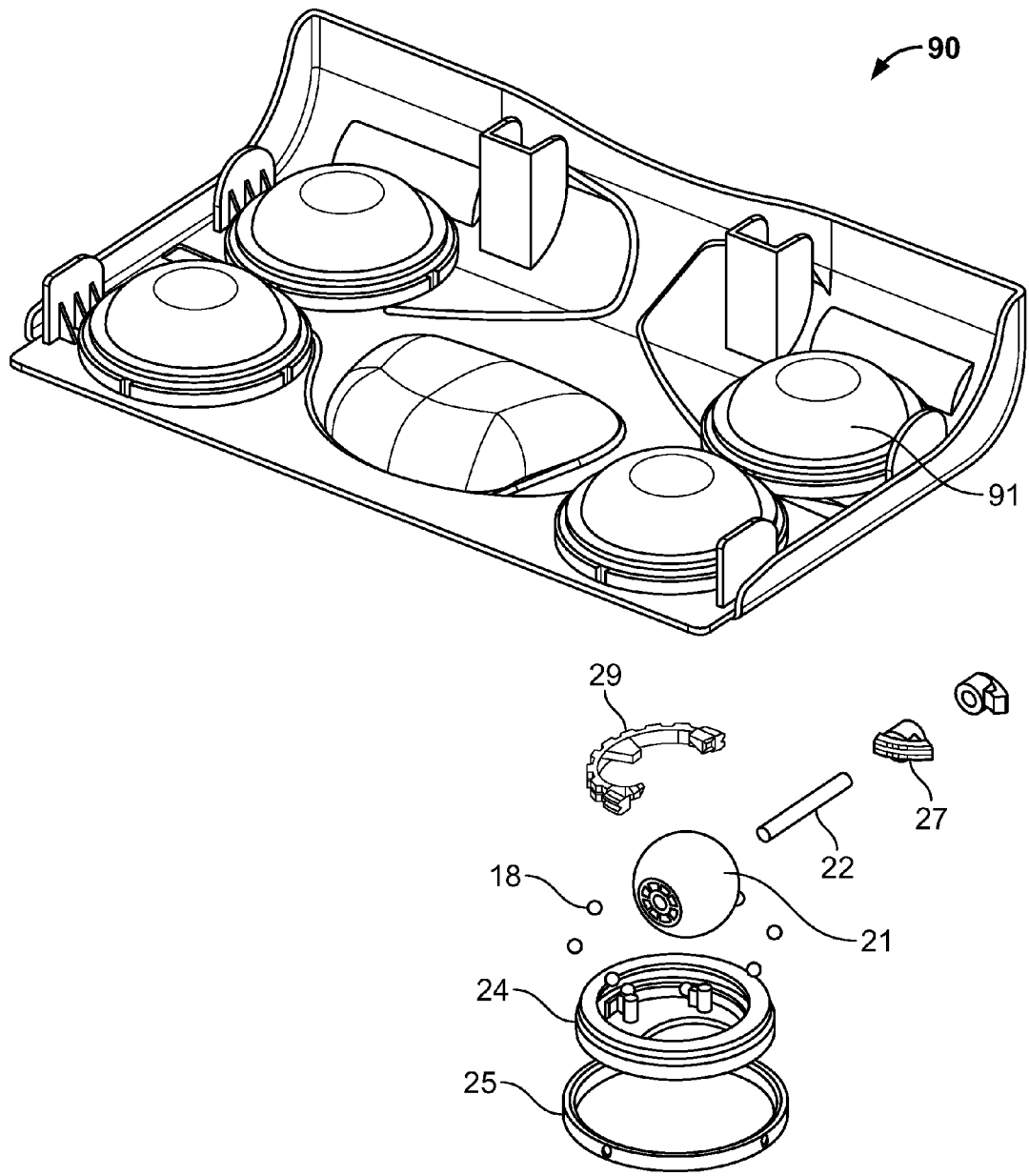
FIG. 11 is an exploded view of an assembly in accordance with certain embodiments of the present disclosure.

FIG. 11 illustrates an exploded view of the caster wheel assembly 20 of FIG. 10. In the example, a wheel 21 is mounted on a shaft 22. The shaft 22 is supported by shaft holders 27 which attach to a wheel carriage clip 29. The wheel carriage clip 29 fits within an outer carriage 24 and ball bearings 18 are positioned between the wheel carriage clip 29 and the outer carriage 24. The wheel carriage clip 29 may alternatively be configured such that it has a bearing channel which tracks along the inside of the outer carriage 24 instead of ball bearings. The outer carriage 24 is positioned within a retention ring 25 with additional ball bearings 18, or a bearing channel, between the outer carriage 24 and the retention ring 25. The retention ring 25 may be fixed to a roller base 90. The roller base 90 has several spherical sockets 91 configured to fix the retention ring 25.

It is appreciated that the disclosure is not limited to the described embodiments, and that any number of scenarios and embodiments may exist. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

We claim:

1. A caster wheel assembly, comprising:
   a wheel mounted for rotation about a horizontal axis within a wheel carriage such that the wheel rotates about the horizontal axis with respect to the wheel carriage wherein:
      the wheel carriage is positioned within a retention ring such that the wheel carriage is free to rotate about a vertical axis with respect to the retention ring,
      the wheel carriage has an opening on a bottom surface such that the wheel is able to make contact with the ground, and
      the horizontal axis about which the wheel rotates is offset from the vertical axis about which the wheel carriage rotates; and
      the retention ring surrounds the wheel carriage in a plane orthogonal to the vertical axis, and
   wherein the wheel carriage is positioned within an outer carriage which is positioned within the retention ring.

2. A caster wheel assembly as in claim 1, wherein the wheel is substantially spherical in shape.

3. A caster wheel assembly as in claim 1, wherein at least a portion of at least one of the retention ring and the wheel carriage is comprised of a viscoelastic material.

4. A caster wheel assembly as in claim 3, wherein the viscoelastic material is polyurethane.

5. A caster wheel assembly as in claim 1, wherein portions of both the retention ring and the wheel carriage are comprised of viscoelastic material.

6. A caster wheel assembly as in claim 5, wherein the viscoelastic material is polyurethane.

7. A caster wheel assembly as in claim 1, wherein a pivot shaft extends through both the retention ring and the wheel carriage.

8. A caster wheel assembly as in claim 1, wherein one or more ball bearings are positioned at the interface between the wheel carriage and the retention ring.

9. A roller assembly comprising:
   a roller base with at least one caster wheel, wherein the caster wheel comprises:
      a wheel mounted for rotation about a horizontal axis within a wheel carriage such that the wheel rotates about the horizontal axis with respect to the wheel carriage wherein:
         the wheel carriage is positioned within a retention ring such that the wheel carriage is free to rotate about a vertical axis with respect to the retention ring,
         the wheel carriage has an opening on a bottom surface of the wheel carriage such that the wheel is able to make contact with the ground, and
         the horizontal axis about which the wheel rotates is offset from the vertical axis about which the wheel carriage rotates;
      the retention ring surrounds the wheel carriage in a plane orthogonal to the vertical axis; and
      the retention ring is fixed to the roller base;
   at least one auxiliary wheel, wherein:
      the auxiliary wheel is mounted at an edge of a bottom surface of the roller assembly,
      the auxiliary wheel is configured to rotate about a second horizontal axis parallel with the edge of the bottom surface of the roller assembly, and
      the auxiliary wheel is displaced vertically from the caster wheel such that when the bottom surface of the roller assembly is parallel to the ground and the caster wheel is in contact with the ground the auxiliary wheel is not in contact with the ground, and
   wherein the wheel carriage is positioned within an outer carriage which is positioned within the retention ring.

10. A roller assembly as in claim 9, wherein the roller base is the bottom surface of a suitcase.

11. A roller assembly as in claim 10, wherein the wheel is substantially spherical in shape.

12. A roller assembly as in claim 9, wherein at least a portion of at least one of the retention ring and the wheel carriage is comprised of a viscoelastic material.

13. A roller assembly as in claim 12, wherein the viscoelastic material is polyurethane.

14. A roller assembly as in claim 9, wherein portions of both the retention ring and the wheel carriage are comprised of viscoelastic material.

15. A roller assembly as in claim 14, wherein the viscoelastic material is polyurethane.

16. A roller assembly as in claim 9, wherein a pivot shaft extends through both the retention ring and the wheel carriage.

17. A roller assembly as in claim 9, wherein the auxiliary wheel is tapered at its center such that it may be mounted in close proximity to the caster wheel.

18. A caster wheel assembly comprising:
   a wheel mounted for rotation about a horizontal axis within a wheel carriage such that the wheel rotates about the horizontal axis with respect to the wheel carriage, wherein:
      the wheel carriage is mounted within an outer carriage such that the wheel carriage is free to rotate about a first vertical axis with respect to the outer carriage,
      the wheel carriage has an opening on a bottom surface such that the wheel is able to make contact with the ground, and
      the horizontal axis about which the wheel rotates is offset from the first vertical axis about which the wheel carriage rotates; and
   the outer carriage is positioned within a retention ring such that the outer carriage is free to rotate about a second vertical axis with respect to the retention ring, and the second vertical axis is offset from the first vertical axis.

19. A roller assembly comprising:
   a roller base with at least one caster wheel, wherein the caster wheel comprises:
      a wheel mounted for rotation about a horizontal axis within a wheel carriage such that the wheel rotates about the horizontal axis with respect to the wheel carriage wherein:
         the wheel carriage is positioned within a retention ring such that the wheel carriage is free to rotate about a vertical axis with respect to a retention ring,
         the wheel carriage has an opening on a bottom surface of the wheel carriage such that the wheel is able to make contact with the ground, and
         the horizontal axis about which the wheel rotates is offset from the vertical axis about which the wheel carriage rotates;
      the retention ring is fixed to the roller base;
   at least one auxiliary wheel, wherein:
      the auxiliary wheel is mounted at an edge of a bottom surface of the roller assembly, the auxiliary wheel is configured to rotate about a second horizontal axis parallel with the edge of the bottom surface of the roller assembly, and the auxiliary wheel is displaced vertically from the caster wheel such that when the bottom surface of the roller assembly is parallel to the ground and the caster wheel is in contact with the ground the auxiliary wheel is not in contact with the ground, and wherein the wheel carriage is positioned within an outer carriage which is positioned within the retention ring.

\* \* \* \* \*